Patented Nov. 12, 1946

2,411,033

UNITED STATES PATENT OFFICE 2,411,033

PROCESS FOR THE COAGULATION OF CASTILLOA LATEX

Tirey Foster Ford, Arlington, Va., assignor to United States of America, as represented by the Secretary of Agriculture No Drawing. Original application August 31, 1943, Serial No. 500,649. Divided and this application November 23, 1945, Serial No. 630,517

3 Claims. (Cl. 260—821)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

This application is a division of copending application for patent, Serial No. 500,649, filed August 31, 1943.

This invention relates to the coagulation of Castilloa latex which in its natural state is normally stable when treated with acids, and has among its objects a process for the coagulation of such latex in a simple manner.

Hevea rubber latex is readily coagulable by acid substances and such coagulation is an essential step in most commercial methods of preparing Hevea rubber. Similar methods cannot be used with Castilloa latex. Commercial development of Castilloa rubber has been retarded by the difficulty and uncertainty of the primitive methods now in use in coagulating its latex.

I have found that Castilloa latex can be coagulated by acid substances and salts used for coagulation of Hevea latex, provided the Castilloa latex is first treated with dilute ammonia, caustic soda, or other alkaline substances, and in the case of acid substances such are used in sufficient quantity to neutralize the alkaline substance and coagulate the rubber. Gentle heating is necessary to produce rapid and satisfactory coagulation and clumping of the rubber, but the heating can be at any time during or after addition of the alkaline and acid substances or salts.

Although the mechanism of the treatment is not known, probably its effect is to dissolve substances other than rubber from the surfaces of the latex particles. So long as these substances, which are probably proteins, coat the particles, they cause the particles to be positively charged, and therefore, to be uncoagulated by positive ions. Removal of these substances by the alkaline substance does not of itself produce coagulation, because negative rubber particles remain, which, like Hevea latex particles, are stabilized by alkaline substances. Like Hevea latex particles, however, they are now coagulable by acid substances and salts used for coagulation of Hevea latex.

I have also found that use of certain alkaline substances, including alkaline salts such as tri-sodium phosphate and sodium carbonate, and even sodium hydroxide and ammonium hydroxide, can produce coagulation alone. In the use of sodium hydroxide, however, coagulation occurs only within a narrow concentration range and is less satisfactory than the results which can be obtained by additional use of an acid substance. With tri-sodium phosphate and sodium carbonate, coagulation is not brought about as easily nor is the coagulum as workable as obtained by using an alkaline substance and an acid substance or salts. Tri-sodium phosphate and sodium carbonate are probably effective because they are strongly alkaline salts, and are capable both of dissolving the protective proteins and of precipitating the resulting colloidal systems.

The following examples, each employing a sample of 15 cc. of undiluted Castilloa latex, which had not been previously treated by "washing" or otherwise, are illustrative of the process of coagulation of this invention.

Example I

A mixture of the sample of latex and 1 cc. of 10 percent NaOH gave no coagulum in the cold or on warming. Addition of 1 cc. of 18 percent HCl to the heated mixture immediately produced a coagulum which was coherent and of good texture. Similar results were obtained by repeating the process, except that the heating was accomplished after the treatment with the hydroxide and the acid.

Instead of using HCl, good results were also obtained by using 1 cc. of 10 percent $H_2SO_4$, 2 cc. of 10 percent acetic acid, or 1 cc. of 10 percent $H_3PO_4$. Coagulation was also produced by using 1½ cc. of 10 percent formic acid, but the coagulum was grainy.

Example II

A mixture of the sample of latex and 1 cc. of 10 percent NaOH gave no coagulum in the cold or on warming. On adding 10 cc. of 10 percent NaCl, a coagulum was obtained which was only loosely coherent. A compact, though grainy, coagulum was obtained by substituting 2 cc. of 10 percent $CaCl_2$ for the NaCl.

The salts mentioned above when used alone did not produce coagulation.

Example III

A mixture of the sample of latex and 2 cc. of 10 percent $Na_3PO_4$ gave on heating a grainy, non-coherent coagulum. Addition of 1 cc. of 10 percent HCl and slight boiling produced clumping of this coagulum. A mixture of the sample of latex and 2 cc. of 10 percent $Na_2CO_3$ gave on heating a loose coagulum.

Heating the untreated latex or boiling it alone did not produce coagulation. Neither was coagulation produced by making the latex only slightly alkaline and then slightly acid, using litmus papers as indicators, even when followed by long heating.

Having thus described the invention, what is claimed is:

1. A process for coagulation of Castilloa latex comprising treating untreated Castilloa latex with dilute NaOH in the ratio of about 15 parts of the latex to one part of the NaOH, and then with an acid substance in sufficient quantity to neutralize the NaOH and coagulate the rubber, and heating to facilitate coagulation of the rubber.

2. A process for coagulating Castilloa latex comprising treating untreated Castilloa latex with dilute NaOH in the ratio of about 15 parts of the latex to one part of the NaOH and then with about 10 parts of dilute NaCl solution, and heating to facilitate coagulation of the rubber.

3. A process for coagulating Castilloa latex comprising treating untreated Castilloa latex with dilute NaOH in the ratio of about 15 parts of the latex to one part of the NaOH and then with about 2 parts of dilute $CaCl_2$ solution, and heating to facilitate coagulation of the rubber.

TIREY FOSTER FORD.